(12) United States Patent
Hale et al.

(10) Patent No.: US 11,792,305 B1
(45) Date of Patent: Oct. 17, 2023

(54) WAREHOUSE CONTROL SYSTEM

(71) Applicant: FIDUS GLOBAL, LLC, Paragould, AR (US)

(72) Inventors: Aarron Hale, Paragould, AR (US); Efton Collins, Bentonville, AR (US); Kelly Meroney, Fayetteville, AR (US); Manish Surati, Decatur, GA (US); Floyd Vanpool, Springdale, AR (US); Erik Lindvall, Indianapolis, IN (US); Damian Perez Cespedes, Odessa, FL (US); Guillermo Francisco López Massón, Montevideo (UY)

(73) Assignee: FIDUS GLOBAL, LLC, Paragould, AR (US)

(*) Notice: Subject to any disclaimer, the term of this patent is extended or adjusted under 35 U.S.C. 154(b) by 0 days.

(21) Appl. No.: 17/845,970

(22) Filed: Jun. 21, 2022

(51) Int. Cl.
H04L 69/08 (2022.01)
H04L 67/12 (2022.01)
G06F 3/04842 (2022.01)
G06Q 10/08 (2023.01)

(52) U.S. Cl.
CPC .......... *H04L 69/08* (2013.01); *G06F 3/04842* (2013.01); *G06Q 10/08* (2013.01); *H04L 67/12* (2013.01)

(58) Field of Classification Search
CPC ....... H04L 69/22; H04L 69/03; H04L 1/0028; H04L 51/066; H04L 69/08
See application file for complete search history.

(56) References Cited

U.S. PATENT DOCUMENTS

| | | | |
|---|---|---|---|
| 6,236,650 B1* | 5/2001 | Le Dantec | H04L 12/413 370/449 |
| 11,551,806 B2* | 1/2023 | Bess | G06N 20/00 |
| 2007/0127597 A1* | 6/2007 | Ammer | G06F 16/26 375/324 |
| 2010/0246514 A1* | 9/2010 | Jeon | H04W 84/12 370/329 |
| 2011/0106564 A1* | 5/2011 | Hachmeister | G16H 30/20 705/3 |
| 2011/0216743 A1* | 9/2011 | Bachmann | H04L 63/164 370/331 |
| 2016/0019196 A1* | 1/2016 | Birdeau | G06F 3/0482 715/224 |
| 2019/0124572 A1* | 4/2019 | Park | H04W 36/0088 |
| 2019/0278961 A1* | 9/2019 | Schrader | B07C 3/18 |
| 2020/0287775 A1* | 9/2020 | Khasis | G07C 5/008 |

(Continued)

*Primary Examiner* — Tonia L Dollinger
*Assistant Examiner* — Linh T. Nguyen
(74) *Attorney, Agent, or Firm* — Schrantz Law Firm, PLLC; Stephen D. Schrantz

(57) ABSTRACT

The warehouse control system (WCS) coordinates communication between communicating devices and systems. The WCS stores mappings of different message types that are transmitted between different components of a warehouse. The WCS accepts inbound messages from the components, parses the inbound messages, and handles the data accordingly. The WCS also transmits outbound messages to components of the warehouse. The WCS forms the outbound message according to protocols defined in the WCS. The WCS maps positions of each message to predefined data fields to define the message type. The mapping of the fields to positions of each message type defines the fields of the message for future message handling.

2 Claims, 17 Drawing Sheets

(56) References Cited

U.S. PATENT DOCUMENTS

| | | | |
|---|---|---|---|
| 2021/0014337 A1* | 1/2021 | Minh | H04L 69/08 |
| 2021/0144210 A1* | 5/2021 | Kolhapure | H04L 41/082 |
| 2022/0013215 A1* | 1/2022 | Bess | G16H 30/20 |
| 2022/0385560 A1* | 12/2022 | Dutta | H04L 45/26 |

* cited by examiner

| Device Name | IP Address | Status |
|---|---|---|
| Scan00 | 200.166.24.20 | ● |
| Scan01 | 200.166.24.13 | ● |
| Scan02 | 200.166.24.24 | ● |
| Scan03 | 200.166.24.62 | ● |
| Scan04 | 200.166.24.2 | ● |
| Scan05 | 205.192.66.23 | ● |
| Scan06 | 205.192.66.24 | ● |
| Scan07 | 205.192.66.20 | ● |
| Scan08 | 205.192.68.32 | ● |
| Scan09 | 205.192.66.45 | ● |

FIG. 16

WAREHOUSE CONTROL SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates generally to a warehouse control system (WCS). A WCS is the middle layer of software that communicates between a Warehouse Management System (WMS) and automation hardware. The WCS is installed on local hardware/server and acts as the program that executes commands and communications from a WMS or complementary application to a Machine's Programmable Logic Circuit (PLC).

The WCS of the present invention provides a user-friendly graphical user interface (GUI) front end to setup integration between hardware devices and/or software applications. The present invention allows the user to define the custom configuration via the GUI to avoid modifying and rebuilding the application. The present invention coordinates communication between source and target systems. The present invention provides mapping to facilitate the communication between the source and target systems. The present invention provides a bridge that enables communication between a WMS and the automation hardware.

The WCS of the present invention functions within the 3 main sectors of the logistics space that include: Sort Centers, Distribution Centers, and Fulfillment Centers. The present invention provides a user customizable WCS that provides the necessary connectors for integrating a WMS platform and the hardware.

The present invention relates to a WCS that facilitates communication between source and target systems. The present invention provides user customized configuration with a user interface to simplify the configuration process. The present invention also allows users to add devices, modify systems, and customize how the system responds upon detection of different conditions.

II. Description of the Known Art

Currently, within the Retail/Ecommerce Industry there are dozens of WMS programs available to companies and integrators that are "Off the Shelf" solutions, similar to readily available "Off the Shelf" PLC and SCADA systems. However, no "Off the Shelf" solution exists for a WCS.

No "Off the Shelf" warehouse control system technology exists within traditional Distribution Center (DCs) and Logistics Sort Centers (SCs) applications. Most WCS technology is offered as custom, but not open or customizable. All, if not most offerings, are bare bones programs that are sold to customers as a "black box" in which the user has no knowledge of the inner workings. The black box simply sends messages without user customization for unique messaging, message handling, and protocols.

Moreover, many End Users have been forced to either build their own WCS, or simply purchase a "Black box" (BB) version from an Integrator/Original Equipment Manufacturer (OEM). To this point, the level of complexity in writing a WCS requires the expertise of Computer Science/Software Development Engineering capabilities which many retailers, as well as mid-level OEMs and mid-level integrators do not possess. The lack of required expertise has allowed the market to be inundated with Black Box proprietary solutions and has created significant barriers to entry for integrators into the logistics industry.

Devices do not natively communicate between each other without having to build additional software or update existing software. This communication between the devices requires customization via skilled software engineers in both the sender and receiver systems, resulting in time spent analyzing, designing, building, and testing the communication between the devices on a case-by-case basis. The present invention simplifies the customization to eliminate the need for the skilled software engineers.

In the black box environment, a company must coordinate with a vendor to make changes because the company cannot update the devices or the WCS software due to the proprietary "black box" in which the WCS is implemented. The vendor is both expensive and very slow sometimes taking months to make simple software changes. The costs and delay of the vendor increases the costs of the application at both the sending and receiving systems, including support costs for maintaining the customization through the life of the devices. As upgrades are performed, the customizations must go through rigorous testing to ensure the customization has not been compromised due to the upgrade.

Certain problems exist with the known art. Known systems do not provide the customization and user interface to update the WCS. The known art does not simplify the process to allow common users to add, update, or otherwise modify the devices.

SUMMARY OF THE INVENTION

The present invention relates to a warehouse control system (WCS) and configuring the system according to a user's needs and configurations. The WCS communicates with the devices installed within the system. The present invention maps fields of the messages associated with the components (devices and systems) to a predefined field. The mapping of the fields of the different messages to predefined fields conforms the fields of the messages to provide for communication and sharing of data between the components. The present invention also enables custom configuration for adding, modifying, or otherwise reconfiguring a warehouse system for communication and operation of the warehouse system.

The WCS orchestrates communication between source and target systems. The WCS stores mappings associated with different message types and messages for the components, such as devices and systems, of a warehouse system. Each device of the source and target systems sends and/or accepts an established message type for communicating with the different components of the warehouse system. The WCS accepts inbound messages from the components, parses the data in the messages, and performs the appropriate action identified in the outbound message for operation of the warehouse system. In one embodiment, the action may include creating and transmitting an outbound message(s) to instructing the receiving component (warehouse device) to perform a function or operation. Another embodiment may include processing the data of the inbound message.

The WCS may convert or otherwise construct an outbound message according to a different protocol to form a message of a different message type for communicating with the components of the warehouse system. The WCS associates each device with a particular communication protocol. The WCS constructs an outbound message of the message type for the designated component.

The WCS parses the inbound message to determine the values for the fields found in the inbound message. The WCS of one embodiment logs the messages of the WCS. The WCS may also construct and transmit outbound messages to other devices that require any data or other information found within the inbound message. The WCS maps the data fields of each message type for communicating between the different components. The data fields of each message type are mapped to a predefined fields to create uniformity across the different components. The uniformity in the fields enables the WCS to communicate with different components using different protocols.

The WCS also provides connectors to the different devices for communication between the systems. The WCS stores the information needed to connect to the different devices, source systems and target systems. The WCS provides the user with the necessary connectors to allow the user to configure the WCS for connecting and communicating with different devices and systems.

The WCS interface provides selections of the different devices and the fields associated with the selected device. The present invention provides user customized configuration with a user interface. The graphical user interface of the present invention simplifies the configuration process. The present invention allows users to add devices, modify systems, and customize how the system responds upon detection of different conditions.

It is an object of the present invention to provide a warehouse control system that allows user configuration.

It is another object of the present invention to provide a control system that allows mixing and matching of different hardware.

It is another object of the present invention to reduce the time required to update or otherwise modify a control system.

It is another object of the present invention to enable communication across a variety of devices and systems.

It is another object of the present invention to simplify configuring a control system.

It is another object of the present invention to increase compatibility of different systems and devices.

It is another object of the present invention to provide different connectors for establishing communication between devices and systems.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 16 is a screenshot of one embodiment of the present invention; and

DETAILED DESCRIPTION

Figure 1:
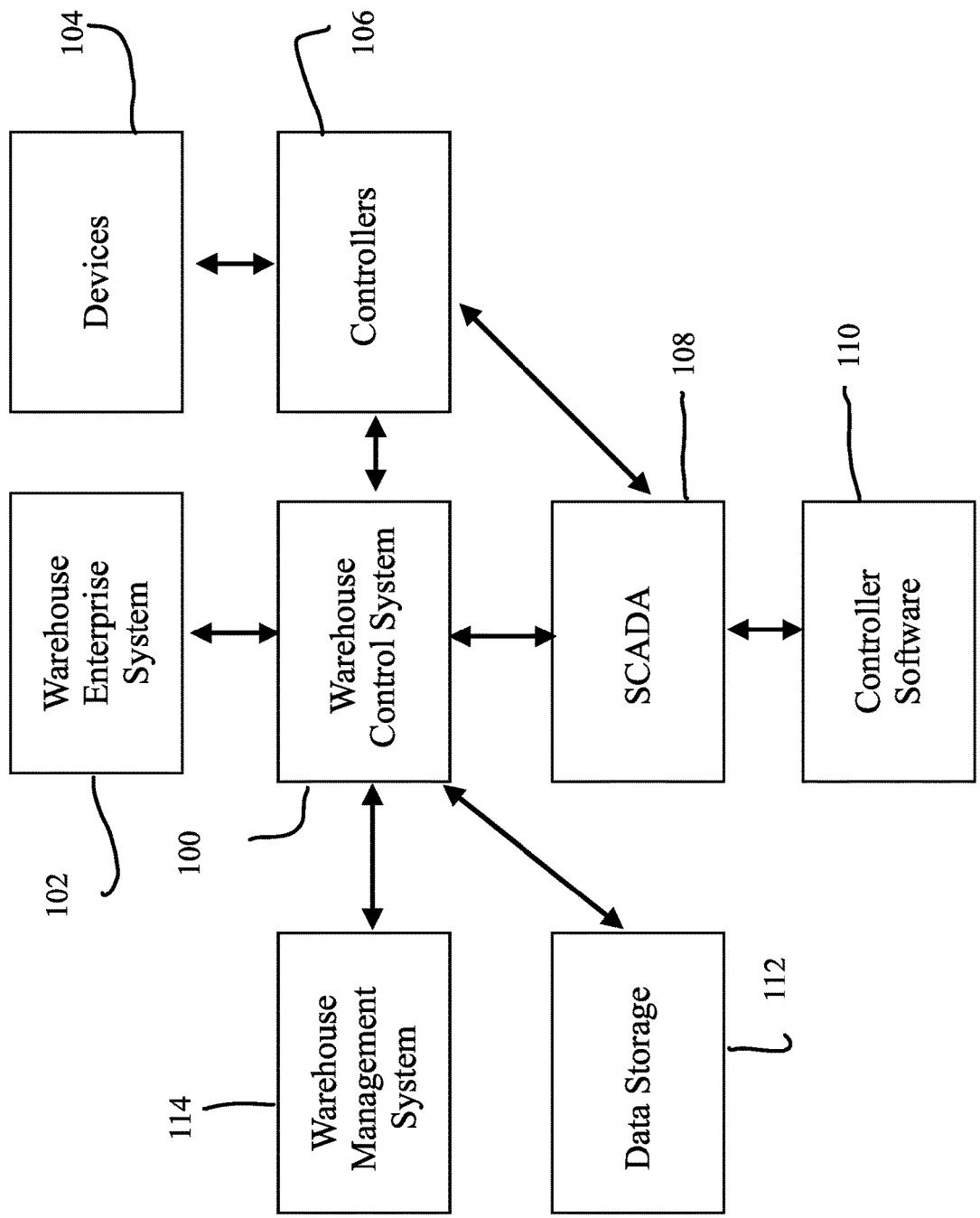
FIG. 1 is an environmental view of one embodiment of the present invention.

The warehouse control system (WCS) 100 configures and controls the warehouse and operations and configures the system according to the user's needs. The WCS 100 integrates Material Handling Equipment (MHE) hardware and software as shown in FIG. 1. The WCS 100 coordinates communication between source and target systems. The user builds a new warehouse system or modifies an existing warehouse system through the WCS 100.

The WCS 100 stores mappings associated with the different message types for the different components of the warehouse system. Each device of the source and target systems accepts an established protocol and message type for establishing communication. The WCS 100 accepts the inbound messages from the different components of the warehouse system. In one embodiment, the WCS constructs an outbound message that includes data values from the inbound message. The WCS parses the inbound messages and constructs an outbound message that includes values from the inbound message. The WCS stores the mappings and associations of the message type of the outbound message for constructing the outbound message.

The WCS 100 communicates directly with the devices 104 or communicates with the devices 104 through controllers 106. The WCS 100 may communicate with the devices 104 directly with the controllers 106 or communicate with the controllers 106 through SCADA 108. The SCADA 108 of one embodiment communicates with controller software 110. The SCADA 108 of one embodiment includes computers, networked data communication, GUI systems for users, sensors, PLCs, and other devices that interface with the WCS 100.

The WCS 100 of one embodiment converts an inbound message from the devices 104 to a different protocol, message, or structure to create and transmit an outbound message for communication between the devices 104 and other systems, such as the Warehouse Enterprise System 102 and the Warehouse Management System 114. In one embodiment, the outbound message instructs a receiving device/system to perform an operation or other function, such as sort, bag, or other operation in a warehouse system.

The WCS 100 associates each device 104 with a particular protocol, message, or structure. The WCS 100 parses the inbound messages or constructs the outbound messages to communicate with the components of the warehouse system, such as the source and target systems, such as, but not limited to, the Warehouse Enterprise System 102, devices 104, and Warehouse Management System 114. The WCS 100 converts a first known protocol, message, and/or structure to a second known protocol, message, and/or structure when communicating between two different components of the warehouse system. The WCS 100 maps the first known protocol, message, and/or structure to identify the data and translates to a second protocol, message, and/or structure that includes the data formatted to the accepted message type of the receiving system.

The WCS 100 also provides connectors to the different devices for communication between the systems. The WCS 100 stores the information needed to connect to the different devices, source systems and target systems within data storage 112. The data storage 112 may be remote, local, or both remote and local. The WCS 100 provides the user with the necessary connectors to allow the user to configure the WCS 100 for connecting and communicating with different systems, including the devices 104, the Warehouse Enterprise System 102, and the Warehouse Management System 114, according to the connectors stored by the WCS within data storage 112.

The WCS interface provides selections of the different devices 104 and systems 102, 114. The WCS 100 provides a user customized configuration with a user interface to simplify the configuration process. The WCS 100 adds devices, modifies systems, and customizes the system responses upon detection of different conditions.

Figure 2:
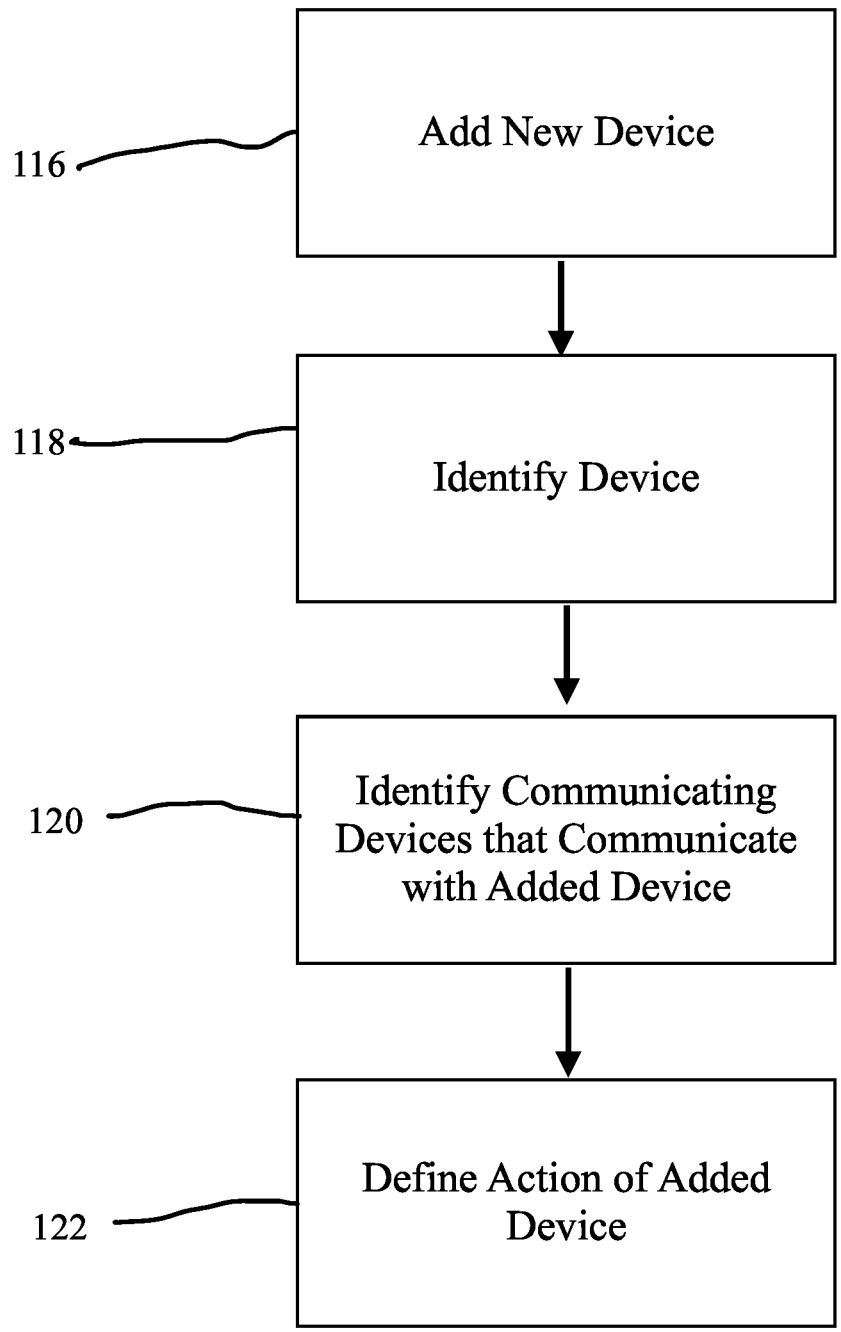
FIG. 2 is a flow chart showing a process of one embodiment of the present invention.

FIG. 2 shows a flowchart for adding a device to the WCS 100 shown in FIG. 1. To add a new device at Add New Device step 116, the user must select the device to be added at Identify Device step 118. The WCS provides the user with a list of devices. The user selects the device to be added from the list. In one embodiment in which the device is not available, the user may define a new device or an administrator may define the new device. The user may then select the newly defined device by the user or the administrator to be added to the system.

The user identifies the communication path for communicating with the added device when identifying the added device at Identify Step 118. The user enters the communication path for communicating with the device and/or system. The communication path may include an IP address, an IP port, a communication address, and any other identification information needed for communication between the devices and systems.

The user then identifies the communicating devices that communicate with the added device at Identify Communicating Devices Step 120. The WCS enables communication between the added device and the communicating device(s)/system(s). The user identifies which communicating devices and/or systems will communicate with the added device for sending and receiving messages with the added device. The messages and messaging protocols between the added device and the communicating devices will be described below. A GUI of the WCS enables defining and customizing the messages and messaging protocols between the communicating devices and systems.

The WCS handles the messaging between the communicating devices and systems. The WCS defines the handling of messages and the messaging between the different devices/systems. The WCS identifies the information found in the messages and relays any required messages to the communicating devices/systems as defined by the messaging configuration.

The WCS may also store the information found in the messages. The WCS stores the mapping and association of each message to identify the values and the fields associated with the values. The WCS associates the different fields of the communicating devices with a predefined field to promote uniform communication between the devices/systems.

The WCS instructs the messaging as to which devices/systems receive data and the data sent to each communicating device/system. The WCS receives inbound messages from the communicating devices/systems. These inbound messages to the WCS may trigger the WCS to transmit an outbound message as a return message.

The WCS stores the rules needed for transmitting the proper messages to and from the communicating devices. The WCS parses each inbound message according to the defined protocols associated with the message type. The WCS identifies the message type and performs the action of the added device defined at Define Action Step 124 associated with the message type. The user defines the functioning of the added device. Such functioning may include actions taken upon receiving particular inbound messages from a communicating device. The WCS receiving the inbound message of one embodiment triggers the WCS to transmit an outbound message to a receiving component. The outbound message of one embodiment instructs the receiving component to perform an action, such as a function or other operation. The inbound message may also instruct the WCS to transmit one or more outbound messages to a receiving component or components. The inbound message may also instruct the WCS to store particular data values from the inbound message.

Figure 3:
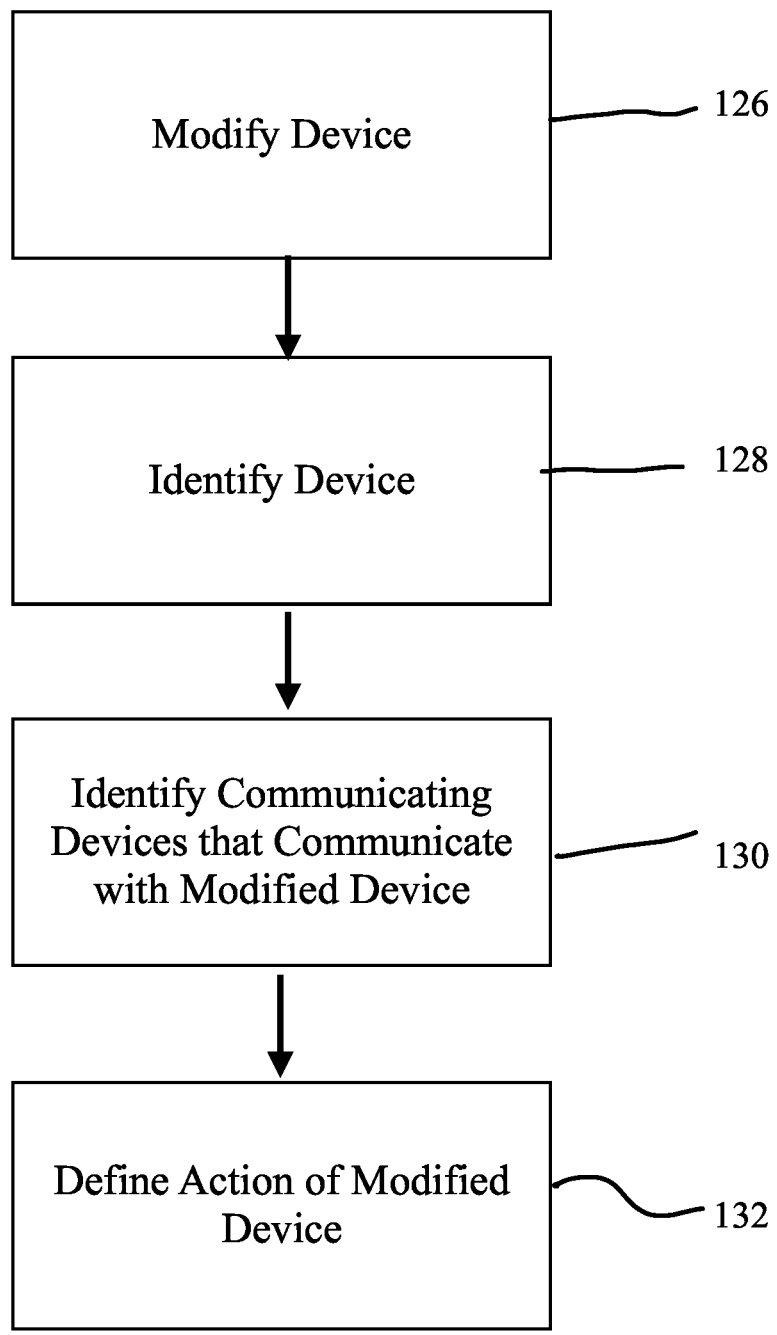
FIG. 3 is a flow chart showing a process of one embodiment of the present invention.

FIG. 3 shows a flowchart for modifying a device in the WCS 100 shown in FIG. 1. To modify a device at Modify Device step 126, the user must select the device to be modified at Identify Device step 128. The WCS provides the user with a list of devices. The user selects the device to be modified from the list.

The user has previously defined the communication path for communicating with the device to be modified at Define Communication step 120 of FIG. 2. The user may modify the communication to the modified device if needed.

The user then defines the communicating devices that communicate with the added device at Identify Communicating Devices Step 130. The user identifies which communicating devices and/or systems will communicate with the modified device.

As discussed above, the WCS handles the messaging between the communicating devices and systems. The WCS defines the handling of messages and the messaging between the different devices/systems. The WCS may then update the communicating devices and protocols for communicating between the modified device and the communicating devices/systems.

The system also allows the user to define the action of the modified device at Define Action Step 132. The WCS stores the rules needed for transmitting the proper messages to and from the communicating devices. The WCS parses each inbound message according to the defined protocols associated with the message type. The WCS identifies the message type and performs the action of the modified device defined at Define Action Step 124 associated with the message type. The user defines the functioning of the added device. The outbound message of one embodiment instructs the receiving component to perform an action, such as a function or other operation. The inbound message may also instruct the WCS to transmit one or more outbound messages to a receiving component or components. The inbound message may also instruct the WCS to store particular data values from the inbound message.

Figure 4:
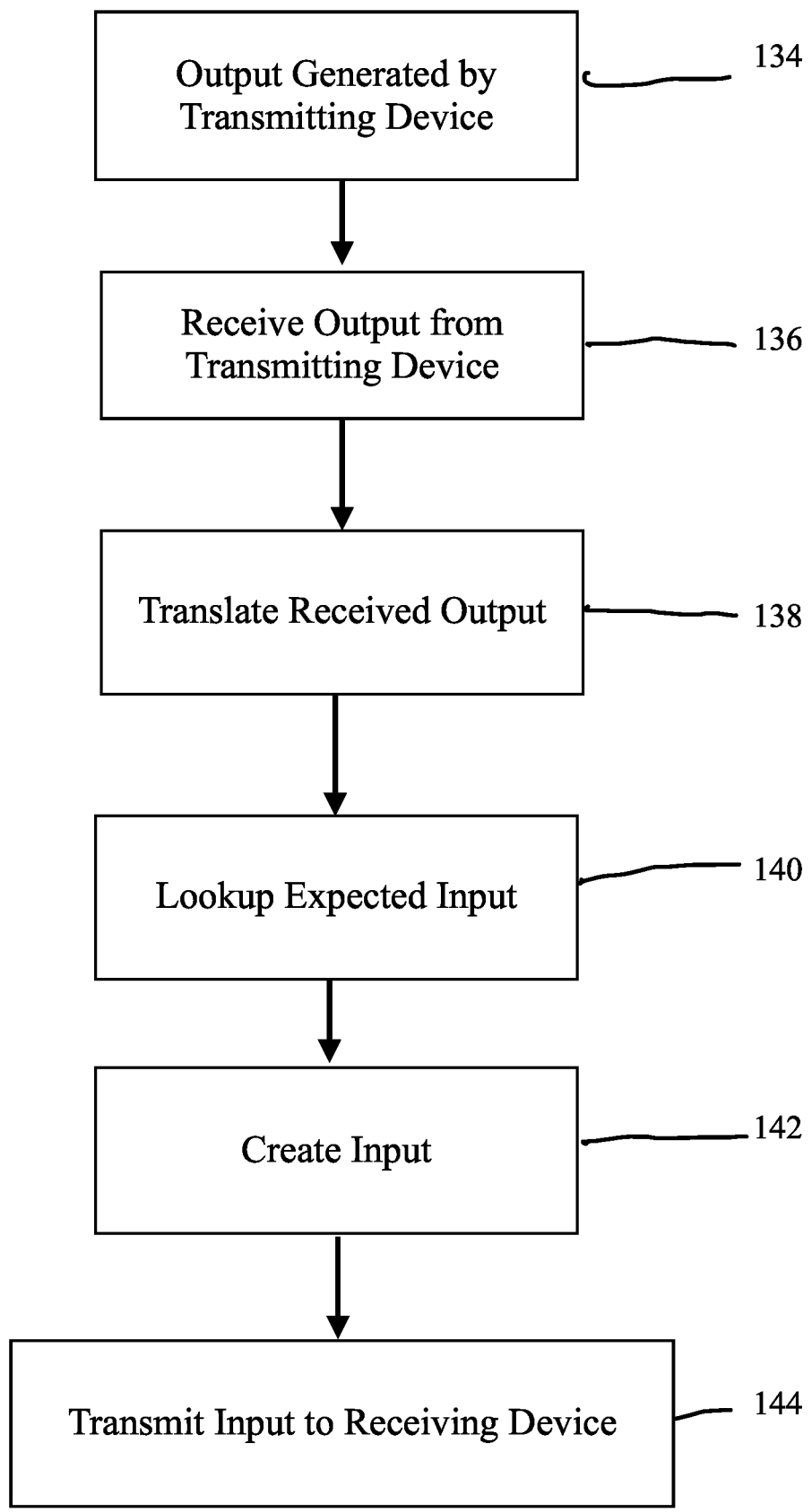
FIG. 4 is a screenshot of one embodiment of the present invention.

FIG. 4 shows the operation of the WCS for communicating between the different devices and systems. The WCS parses an inbound message sent by a transmitting device/system to construct an outbound message for a receiving device/system. The transmitting device/system generates the inbound message at Inbound Message Generated by Transmitting Device Step 134 that is received by the WCS at Receive Inbound Message Step 136. The WCS parses the inbound message to identify the message type and the device/system sending the inbound message. The WCS identifies the data values and the associated fields of the inbound message at Parse Inbound Message step 138. The WCS parses the data from the message and associates the data with the predefined data fields that provides a universal mapping across the components, such as the devices and systems.

The WCS then identifies the receiving device/system that receives the outbound message from the WCS at Lookup Message Type of Outbound Message Step 140. Each receiving device/system is associated with a message type. The WCS creates an outbound message for the receiving device/system. The WCS formats the outbound message according to the protocols for the accepted message type for the receiving device/system. The accepted message type may be formatted for an accepted protocol, message, or structure.

At Create Outbound Message Step 142, the WCS creates an outbound message that includes the data required for the specified message type. The WCS parses the inbound message to identify the data to be included in the outbound message. The WCS creates an outbound message that includes the values of the inbound message that are also associated with the fields of the outbound message. The WCS formats the outbound message according to the protocol of the message type of the outbound message. The data received in the outbound message is formatted to the appropriate data fields and position for the message type to create the outbound message. The WCS then sends the outbound message to the receiving device/system at Transmit Outbound Message Step 144. The WCS sends the outbound message to the receiving device/system using the previously defined communication path or address of the receiving device/system.

Figure 5:
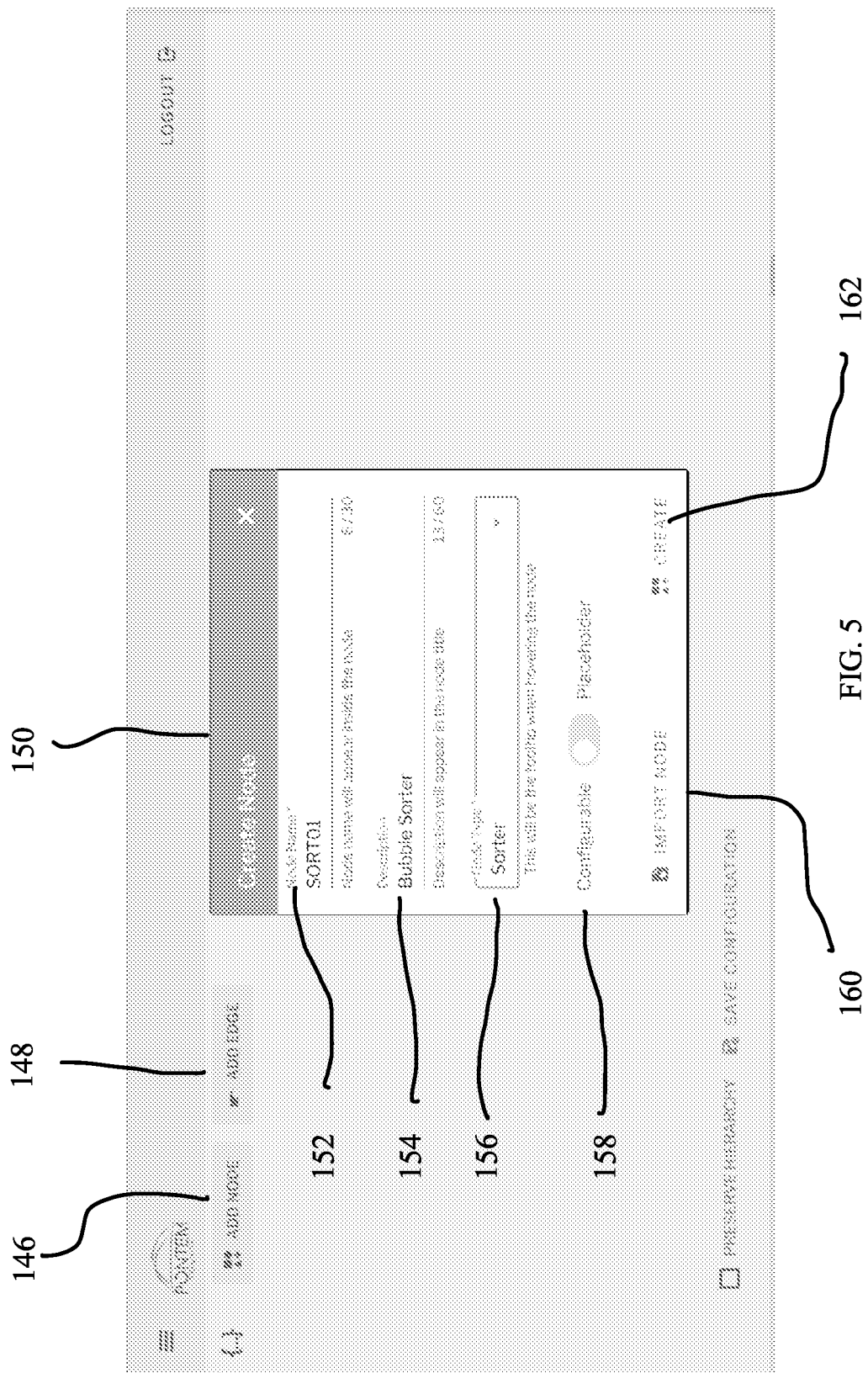
FIG. 5 is a screenshot of one embodiment of the present invention.

FIGS. 5-17 show more detailed views of the WCS. FIG. 5 shows different configurations available to a user for configuring a warehouse system. The user may add a node at Add Node 146, add an edge at Add Edge 148, remove a node at Remove Node 164, and duplicate a node at Duplicate Node 166.

FIG. 5 shows a step of creating a node at Create Node Input 150. Each node shows an object, such as a device or system, that appears on the GUI of the WCS to configure the warehouse system. The edges show the connections between the different nodes.

The user enters data for each data field associated with the node. The data fields include Node Name 152, Description 154, Node Type 156, Configurable Selection 150. The user can then create a node with the added data fields at Create Node 162. The user can also import a node at Import Node 160.

The Node Type 156 refers to the type of device/system of the node. The node type 156 includes sorters, cameras, RFID readers, WES System 102, WMS 114. The user selects the Node type 156 to inform the system of the type of device/system installed within the warehouse system.

The WCS also provides a Configurable Selection 150. The configurable selection 150 identifies the node as configurable or a placeholder. Configurable nodes identify key components of the warehouse system to be defined to configure a functioning warehouse system. The placeholder nodes depict other components that describe the makeup of the overall warehouse system.

Figure 6:
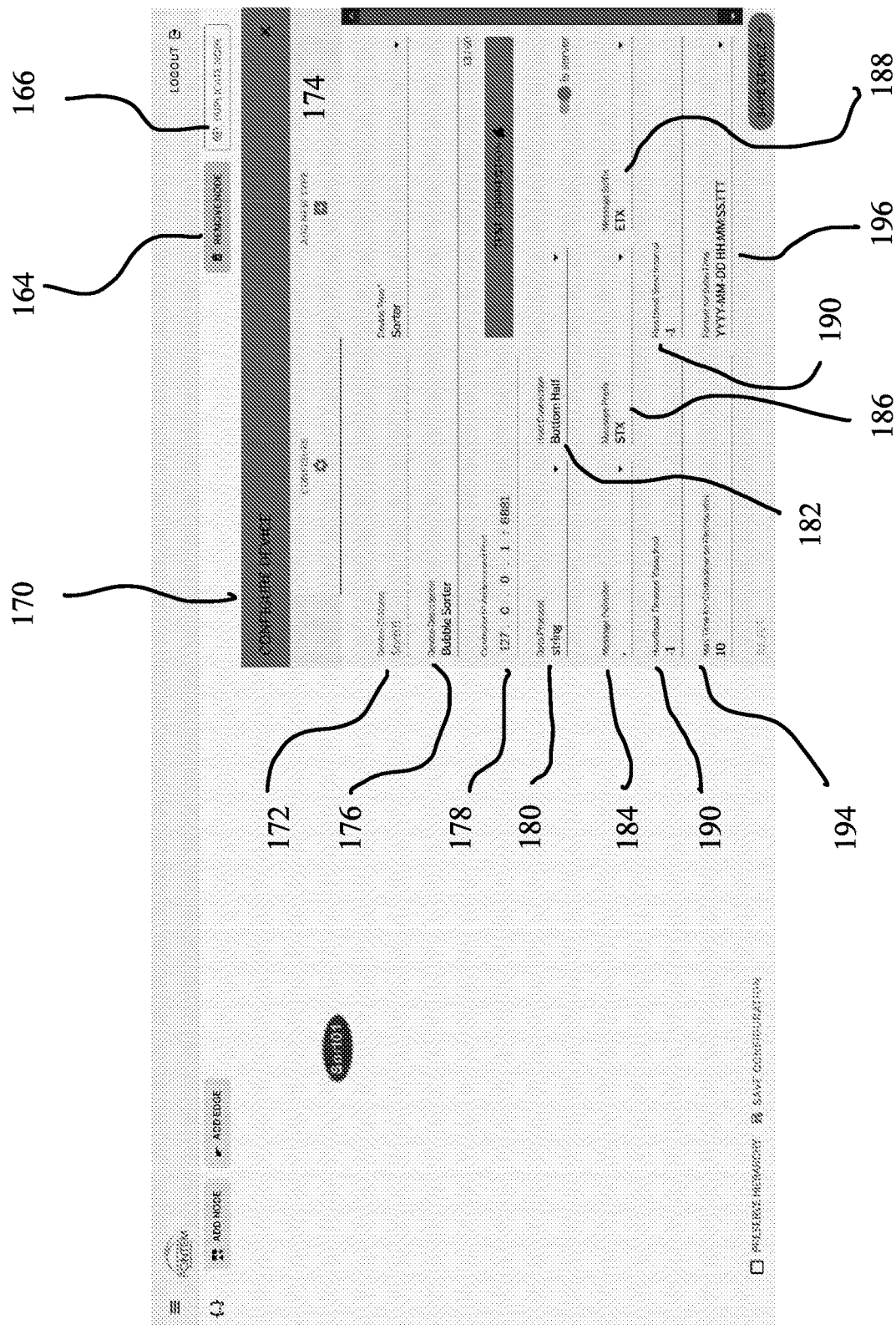
FIG. 6 is a screenshot of one embodiment of the present invention.

FIG. 6 shows the Configure Device Input 170 for configuring a configurable node created from FIG. 5. When configuring the device at Configure Device Input 170, the user enters operational information for the different device fields of the device, such as the sorter, to define and identify the device. Such device fields include, but are not limited to, Device Type 174, the Device Description 176, Communication address 178, data protocol 180, host connection 182, message delimiter 184, message prefix 186, message suffix 188, heartbeat timeout value 190, heartbeat send interval 190, max time for container on recirculation 194, and format for date/time 196.

The WCS accepts the network address of the device/system at Controller IP Address and Port 178. The WCS communicates with the device/system identified in the node at the network address. The user may test the connection through the WCS to confirm that the WCS communicates with the node (device/system).

The WCS also configures the device/system to identify the data protocol 180, the host connection 182, the message delimiter 184, the message prefix 186, and the message suffix 188. The data protocol identifies the protocol for communicating with the device/system. In one embodiment, the data protocol is a string. Other data protocols may be available for configuring the warehouse.

The user also defines the host connection for communicating with the device/system. The user also identifies the message delimiter, message prefix, and message suffix of the messages communicating with the device/system identified at the node. The delimiter separates the different data fields. The message prefix identifies the beginning of a message and the message suffix identifies the end of the message. The different data fields are found between the message prefix and the message suffix separated by the delimiters.

The user also defines the heartbeat timeout value 190 and the heartbeat send interval 192 for the node identifying the device/system. The heartbeat is a periodic signal generated by the hardware or the software of the device/system to indicate normal operation or to synchronize other parts of the warehouse system. Identifying the heartbeat value and interval enables better communication between the device(s) and system(s) of the warehouse and identifies errors and other problems between the device(s) and system(s) of the warehouse.

On a sorter, the WCS also allows the user to identify the maximum amount of time for a container to travel on a recirculator at Max Time on Recirculator 190. The user defines the maximum time for a container to travel on the recirculator. The WCS activates an alarm, alert, or other signal to indicate that a container has been on the recirculatory longer than the maximum time identified at Max Time on Recirculator 190.

The user also defines the date/time format for the device/system at the node at Format for Date/Time 196. The user indicates the proper format for the date and time of the device/system.

The Device Description 208 identifies the type of device/system at the node and defined by the Device ID 206. In one embodiment, the WCS includes, but not limited to, alerts, autobaggers, printers, scanners, sorters, WCS Systems, WCS HTTP Servers, WES systems, WMS Systems, cameras, photo eyes, and RFID Readers as device/system types identified by Device Description 208.

The WCS system stores different field mappings for each Message Type 208. Each mapping identifies the fields associated with each Message Type 208. The WCS also stores the position of each field in the message of each Message Type 208.

The Control Table 210 identifies the source table for messages to be processed for the type of device/system defined by the Device Description 208. For example, the Control Table 210 indicates that the control_message table processes messages for the system/device identified by Device ID 206.

Table 1 below shows the type of message and the mapping of the fields with the position (host_sequence).

TABLE 1

| message_type | event_id | control_table | column_name | host_name | host_sequence | required |
|---|---|---|---|---|---|---|
| S01 | | control_message | message_type | Message Type | 1 | |
| S01 | | control_message | message_id | Message ID | 2 | |
| S01 | | control_message | device_id | Device ID | 3 | |
| S01 | | control_message | container_id | Container Id | 4 | |
| S01 | | control_message | received_on | Received On | 5 | |
| S02 | | control_message | message_type | | 1 | |
| S02 | | control_message | message_id | | 2 | |
| S02 | | control_message | device_id | | 3 | |
| S02 | | control_message | container_id | | 4 | |
| S02 | | control_message | location_id | | 5 | |
| S02 | | control_message | status_number | | 6 | |
| S02 | | control_message | received_on | | 7 | |
| S03 | | control_message | message_type | | 1 | |
| S03 | | control_message | message_id | | 2 | |
| S03 | | control_message | device_id | | 3 | |
| S03 | | control_message | container_id | | 4 | |
| S03 | | control_message | location_id | | 5 | |
| S03 | | control_message | final_location_id | | 6 | |
| S03 | | control_message | reason_code | | 7 | |
| S03 | | control_message | confirmed_on | | 8 | |

Figure 7:
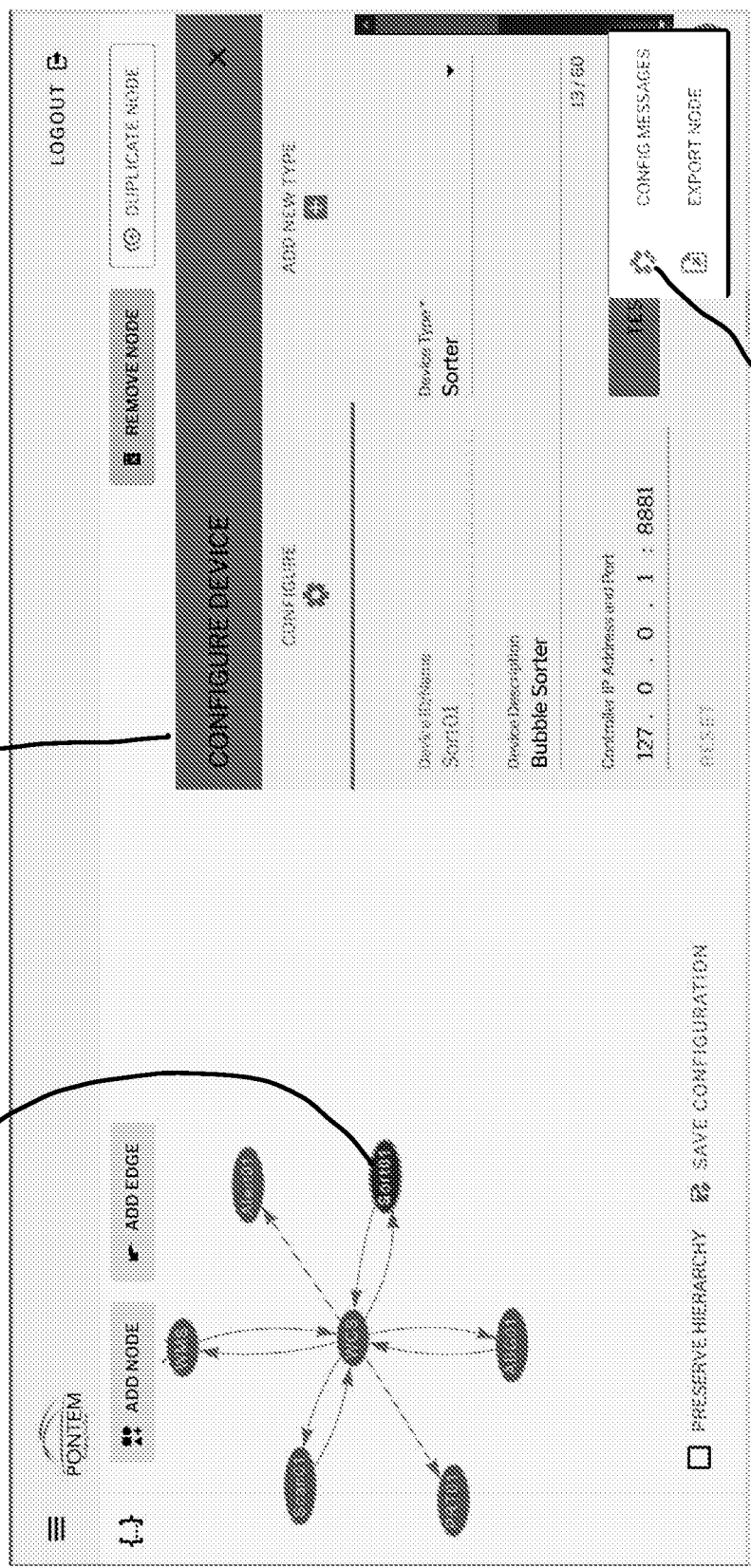
FIG. 7 is a screenshot of one embodiment of the present invention.

FIG. 7 shows the individual nodes depicting the components of the warehouse system and the node configuration 168. The node configuration shows the links between the different nodes and the WCS. FIG. 7 also shows the Configure Device Window 170 and the Configure Messages Option 200. Configure messages enables the user to define custom messages communicated and processed by the WCS. The custom message configurations create unique functionality for different warehouse setups and configurations.

The user has previously identified the message prefix, message suffix, and the message delimiter of the device/system defined at the node. The message prefix identifies the beginning of the message for the node. The message suffix identifies the end of the message for the node. The delimiter separates each field of the message of the node.

Figure 8:
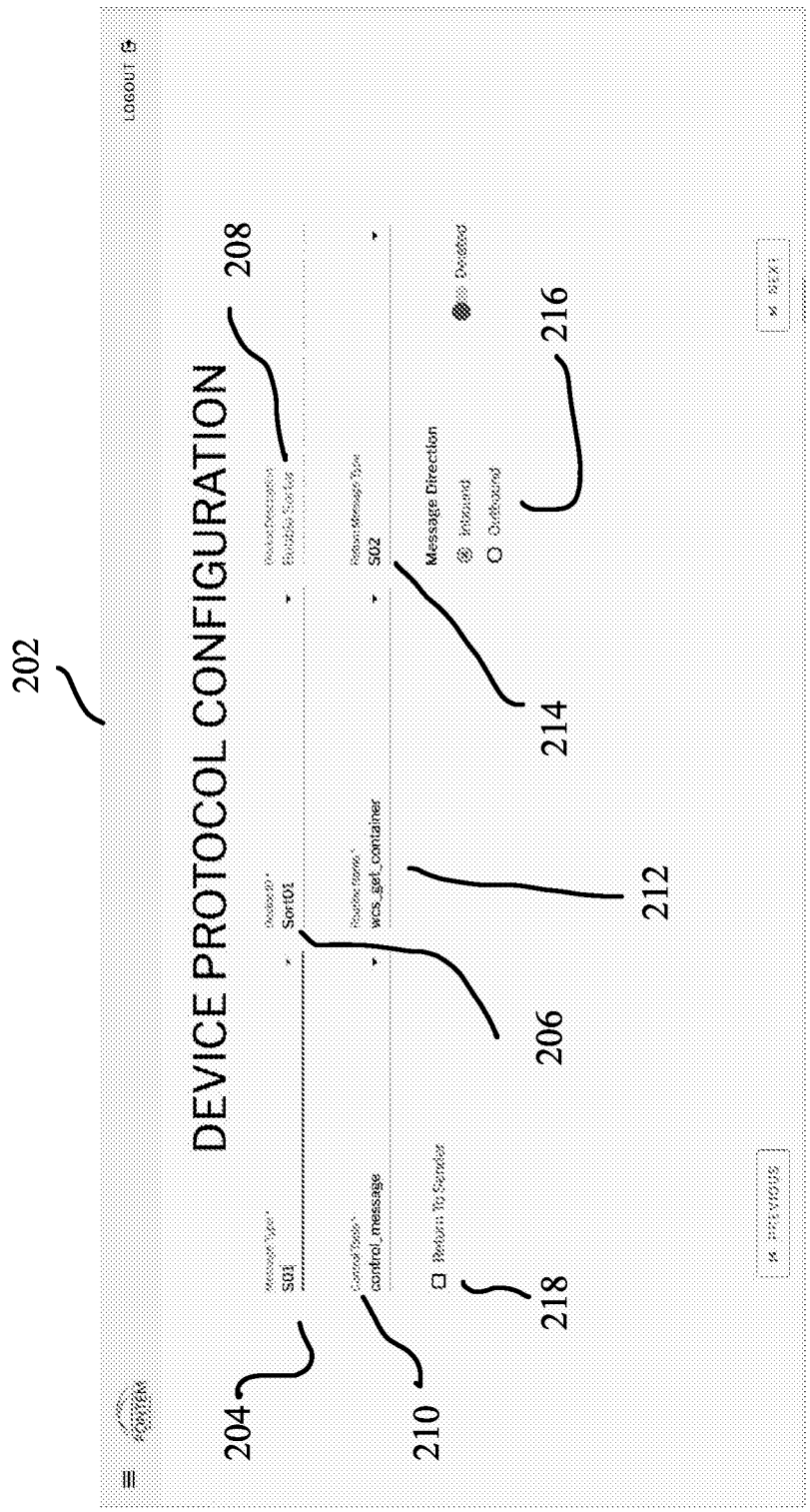
FIG. 8 is a screenshot of one embodiment of the present invention.

FIG. 8 shows message protocol configuration 202 for the device/system defined at the node. The user defines the Message Type 204, Device ID 206, the Device Description 208, the Control Table 210, the Routine Name 212, and the Return Message 214. The Device ID 206 and Device Description 208 identify the device/system and the type of device/system at the node. The Device ID 206 identifies the specific device/system located at the node.

The control table stores field mappings for messages that define the messages, the sequence of the fields, the positioning of each field in the message, and the number of fields in the message. The control table links the host message field of the device/system to database table and column. The field mappings and message mappings are maintained by the GUI of the WCS. The field mappings and message mappings of the control table of one embodiment are fetched by the WCS at startup and cached in a global table/array to avoid hitting the database for each message received/sent. The control table is linked as a child to the device protocol master shown below for a one to many definition.

TABLE 2

| Pos | Column Name | Description | Data Type | Length |
|---|---|---|---|---|
| 1 | message_type | Message Type | varchar | 20 |
| 2 | event_id | Event ID | varchar | 20 |
| 3 | control_table | Table Name | varchar | 40 |
| 4 | column_name | Column Name | varchar | 50 |
| 5 | host_name | Host Column/Field Name (Optional) | varchar | 50 |

TABLE 2-continued

| Pos | Column Name | Description | Data Type | Length |
|---|---|---|---|---|
| 6 | host_sequence | Inbound Sequence Number from Host | int | |
| 7 | required | Required Field cannot be blank or null | enum | 1 |
| 8 | created_by | Created By User | varchar | 30 |
| 9 | created_on | Create Date | datetime | 30 |
| 10 | updated_by | Updated By User | varchar | 30 |
| 11 | updated_on | Update Date | datetime | 30 |

The user also defines the Routine Name 212 associated with the device and message type. The routine name informs the WCS of the messages associated with the routines. The user also identifies a Return Message Type associated with the Routine Name 212 and the Message Direction 216. The message direction indicates if the message is inbound or outbound to the WCS. The user identifies if the return message is returned to sender at Return to Sender 218 and if an acknowledgement is required.

Figure 9:
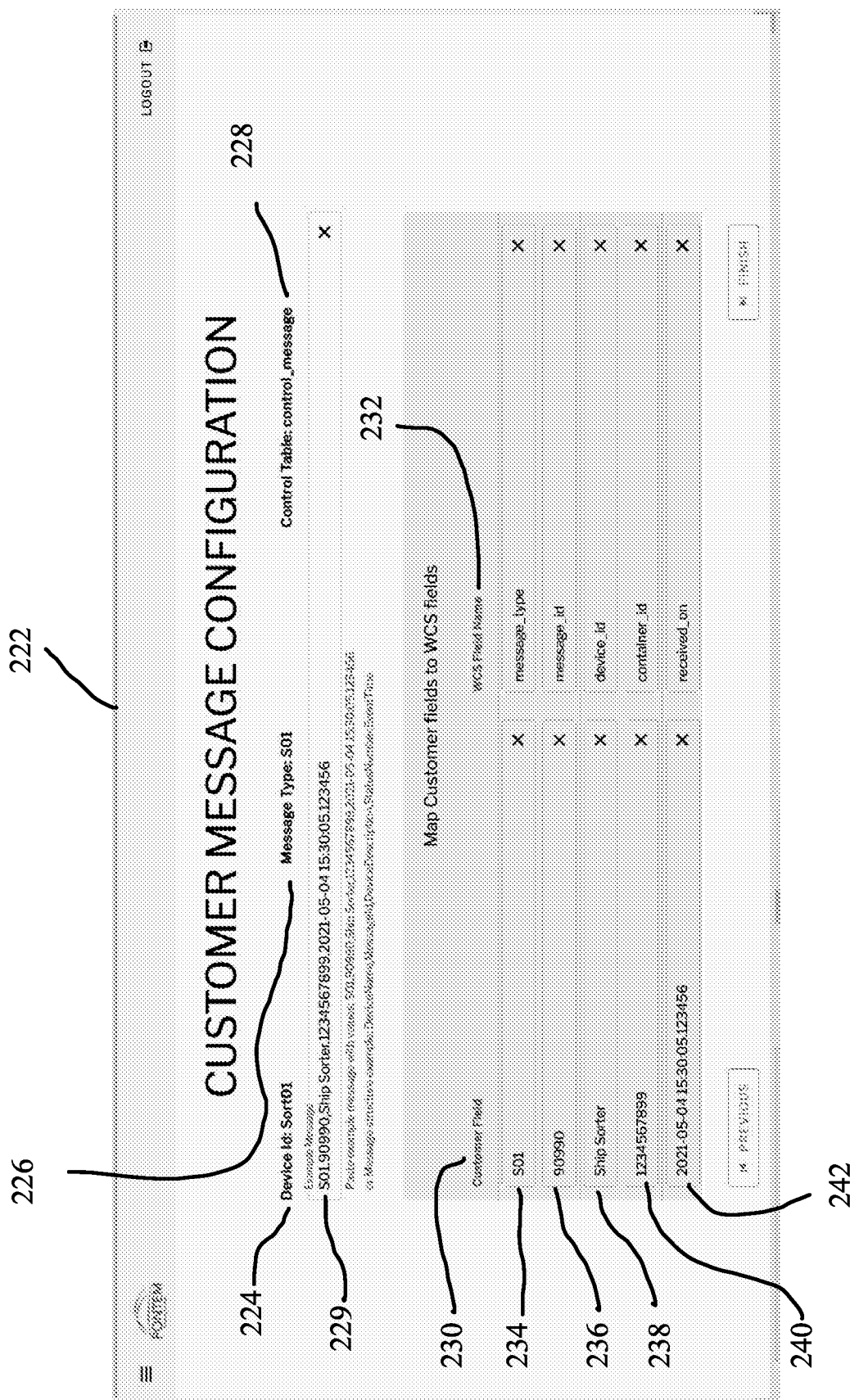
FIG. 9 is a screenshot of one embodiment of the present invention.

FIG. 9 shows the Customer Message Configuration 222 for defining the message type. The WCS shows the Device ID 224, the Message Type 226, and the Control Table 228 associated with the message to be configured. The Device ID 224, the Message Type 226, and Control Table 228 are defined in the Device Protocol Configuration shown in FIG. 8.

The user enters an example message into the Configuration Input 229 to be defined. For example, the user enters S01,90990,Ship Sorter,1234567899,2021-05-04 13:30: 05.123456 into the configuration input 229. The message separates the different fields via the delimiters, such as the commas.

The WCS parses the message entered into configuration input 229. The WCS identifies the number of fields and the placement/position of the fields within the message. The WCS parses the message to identify each value in the message and the positioning within the message.

The GUI (graphical user interface) of the WCS lists each value found within the message. The WCS lists the different values of the message. The GUI provides a mapping selection that allows the user to associate each value with a predefined field. Such mapping associates a position of a value within the message with a predefined field. The predefined fields create data conformity of the different message types of the components for proper communication between the components.

The WCS maps each value in the message to predefined fields, such as the appropriate WCS field, to create the associations. Identifying the associations from the sample message maps the user's fields with the predefined fields for establishing communication between the devices/systems in the WCS.

The WCS parses the inbound message to identify each value between the delimiters. The WCS then lists each value of the message in the Consumer Field 230. The WCS provides a list of different predefined fields 232 to be selected to match the value in Customer Field 230. The user selects a predefined field from Field Names 232 to be associated with the values in Customer Field 230. The WCS creates an association with the placement of the value in the message to the appropriate field. Such an association between the value placement within the message and the field allows the WCS to parse other messages of the same type for communicating between the different devices/systems.

The user maps each Customer Field 230 with a WCS Field 232 through the Customer Message Configuration 222. The WCS stores the mapping that associates each Customer Field 230 with a WCS Field 232 as shown in Table 1 above. Table 1 shows the position of each WCS Field 232 within the particular message, such as Message Type: S01. The WCS identifies the number of fields associated with each message type and stores the position of each WCS Field within the message.

The message entered at Configuration Input 229 shows a string with four (4) delimiters to show five different fields. The user defines the mapping by matching each Customer Field 230 with the WCS field 232. Message Type S01 includes five fields. The WCS maps the associations and stores the mapping as shown by Table 1.

For example, Table 1 shows that message type S01 has 5 fields shown by host_sequence 1-5. Table 1 shows that Message Type is the first field in the message, Message ID is the second field, Device ID is the third field, Container ID is the fourth field, and Received on is the fifth field.

The GUI of the WCS associates the position of each predefined field associated with the sample message. The GUI allows the user to associate each predefined field with the positioning of the field in the message. As shown in FIG. 9, the WCS associates each message type with the positioning of the fields. The message is unique. For example, each message may be associated with a unique ID. The example in FIG. 9 shows a unique message formed by unique values for Device ID, Message Type, and Control Table.

The GUI identifies each value within the sample message. The values are separated by the delimiter associated with the unique message type. For example, the delimiter for message type S01 is the comma. The delimiter separates each field and identifies the position in each message. For example, the WCS identifies the positions for a message with a comma delimiter as:

Position 1, Position 2, Position 3, . . . , Position N−1, Position N.

For sample message: S01,90990,Ship Sorter,1234567899, 2021-05-04 13:30:05.123456 the WCS assigns each value a position:

S01: Position 1
90990: Position 2
Ship Sorter: Position 3
1234567899: Position 4
2021-05-04 13:30:05.123456: Position 5

The GUI allows the user to assign each value to a predefined field. The user assigns each value to a predefined field to define the position of each predefined field in the unique message type. For example, the sample message shown in FIG. 9 has been assigned as follows:

S01: Message Type
90990: Message ID
Ship Sorter: Device ID
1234567899: Container ID
2021-05-04 13:30:05.123456: Received On The predefined fields link the matching fields of each message type. Assigning the predefined fields to the values identifies the position of each predefined field within the message type. For example, in the sample message, the WCS identifies the following positions of message type S01:

Position 1: Message Type,
Position 2: Message ID,
Position 3: Device ID,
Position 4: Container ID, and
Position 5: Received on.

The WCS receives the inbound message and modifies the inbound message to an outbound message that is transmitted. The outbound message includes the values of the matching fields from the inbound message in the outbound message. For example, an S01 message leads to creating and transmitting an S02 message. The predefined fields of the S02 message include:

Message id, item id, message type, tracking number, location id, status number, received on.

The WCS has previously associated the predefined fields of Message Type S02 as:

Position 1: Message type,
Position 2: message id,
Position 3: Device ID,
Position 4: Container ID,
Position 5: location id,
Position 6: status number, and
Position 7: received on.

The WCS creates the outbound message by including all matching fields from the inbound message. From S01 to S02, the matching fields include Message ID, Device ID, and Container ID. The WCS creates the outbound message and includes the matching fields, such as Message ID, Device ID, and Container ID in the proper positions defined for S02.

The WCS creates the following message in response to receiving S01:

S02,90990,Ship Sorter,1234567899,L0001,0,2021-05-04 15:30:05.789000

The computing system then transmits the outbound message to the receiving warehouse device.

Figure 10:
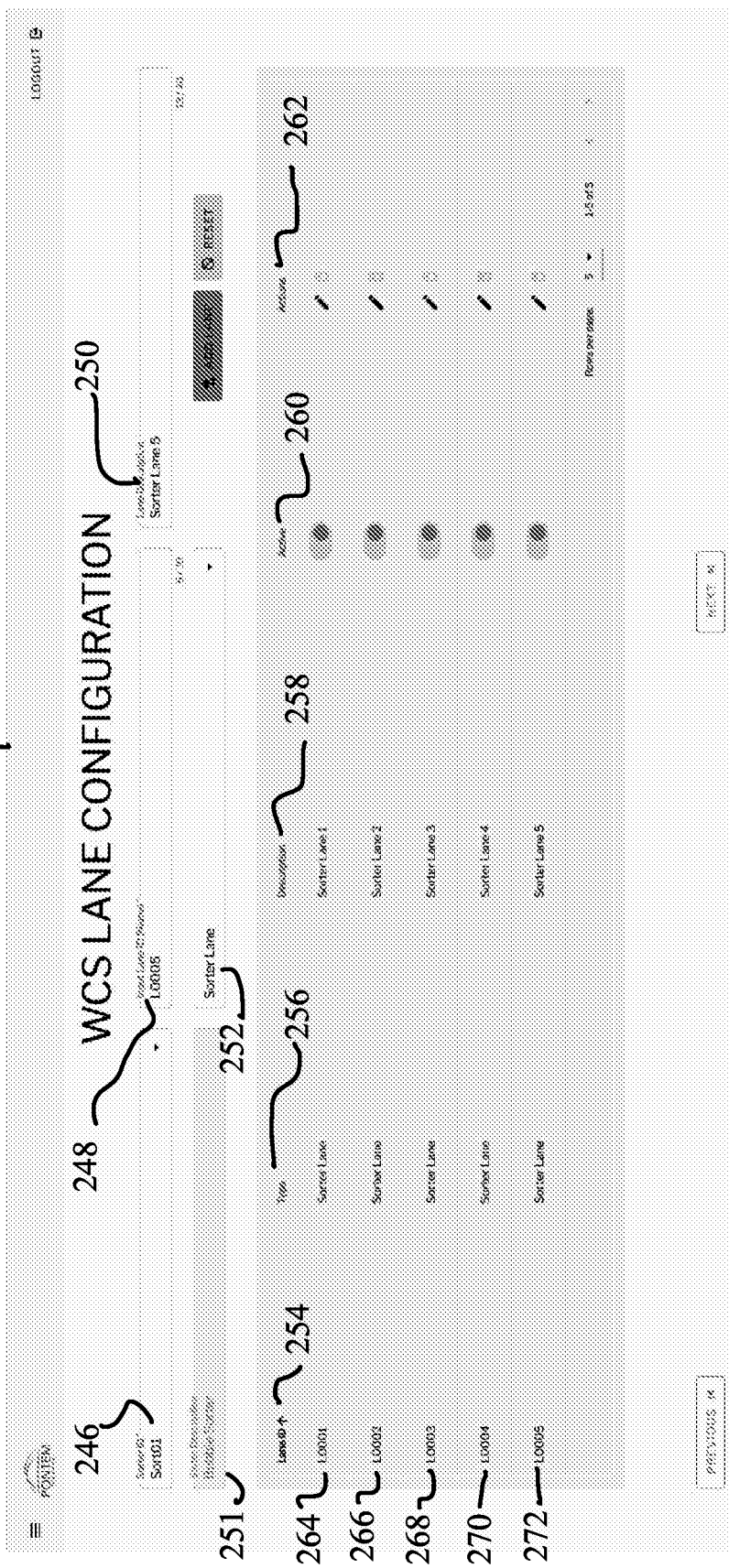
FIG. 10 is a screenshot of one embodiment of the present invention.

FIG. 10 shows the Lane Configuration 244 for the warehouse system. The lanes are associated with Sorter ID 246. The user identifies the Lane ID 248, the Lane Description 250, and the type 252. The Sorter Description 251 was previously defined.

The Lane Configuration 244 shows the lane information for the lanes 264, 266, 268, 270, 272. The lane information includes, but is not limited to, the Lane ID 254, the Type 256, the Description 258, and Active Status 260. The user may also modify or delete the individual lanes at Actions 262.

Figure 11:
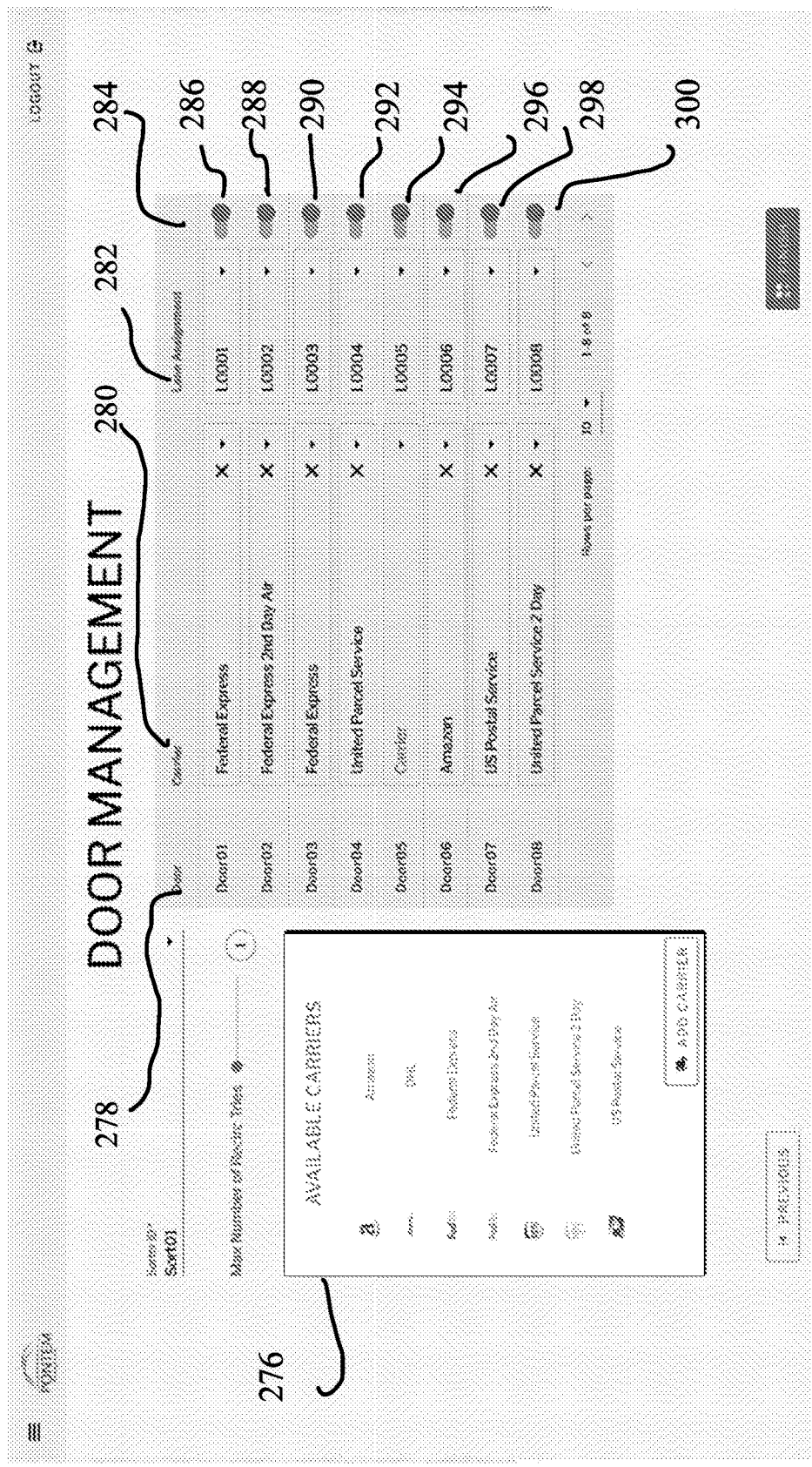
FIG. 11 is a screenshot of one embodiment of the present invention.

FIG. 11 shows the door management 274 to assign the doors to lanes and carriers. The WCS maps each door with a lane and a carrier. Each door 286, 288, 290, 292, 294, 296, 298, 300 is assigned a Door ID 278, a Carrier 280, and a Lane Assignment 282. The user may toggle whether the doors are active at Active Toggle 284. The WCS stores the mapping and associations of the Door ID, Carriers, and Lane assignments.

Figure 12:
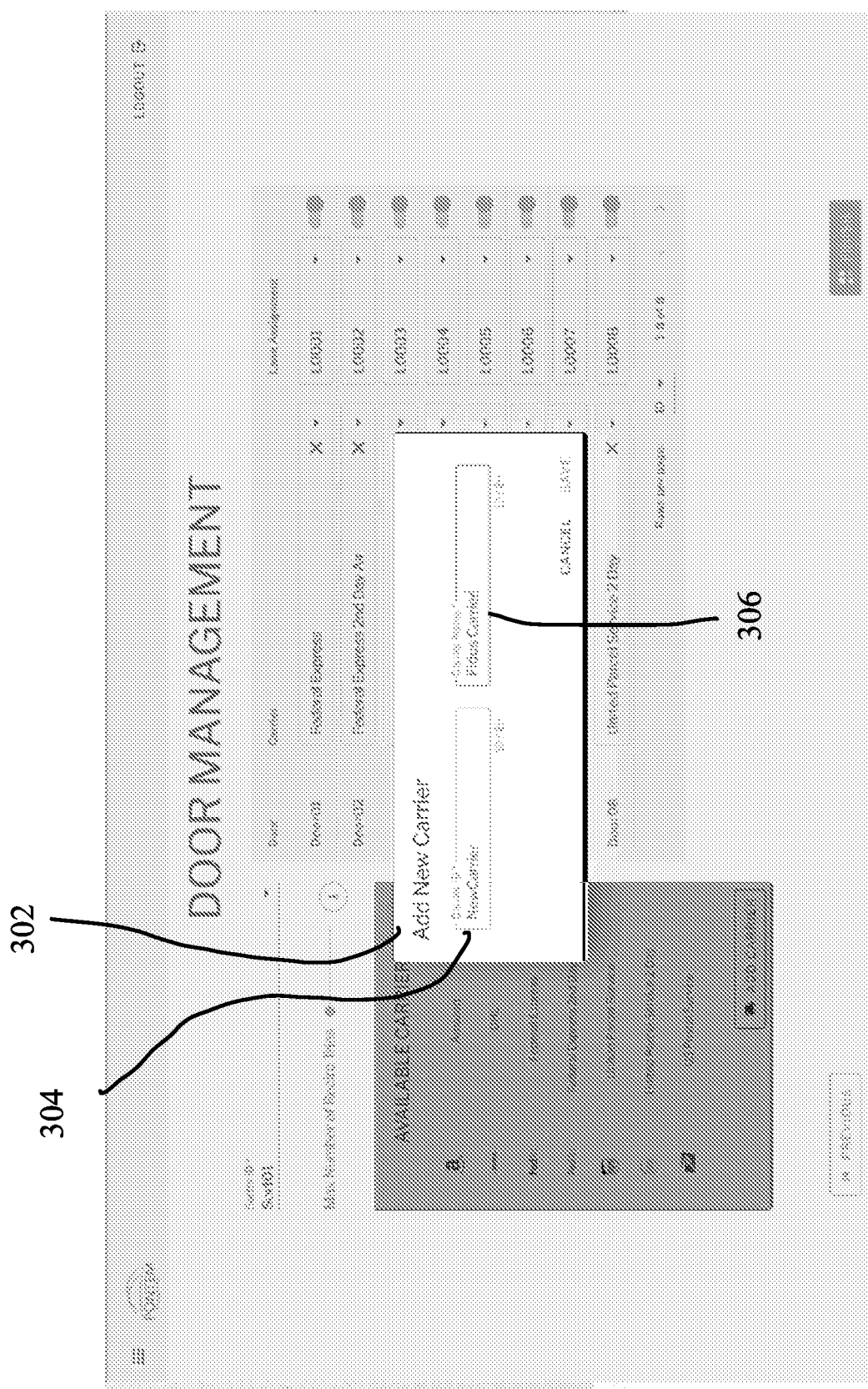
FIG. 12 is a screenshot of one embodiment of the present invention.

The WCS provides a list of Available Carriers 276. The available carriers identify the different carriers to be assigned to a Door ID or multiple Door IDs. The user may also add a carrier to the Available Carriers 276 as shown in FIG. 12. The WCS dynamically assigns lanes to carriers that are assigned to each door for routing containers/packages to the correct carrier for shipping.

Figure 13:
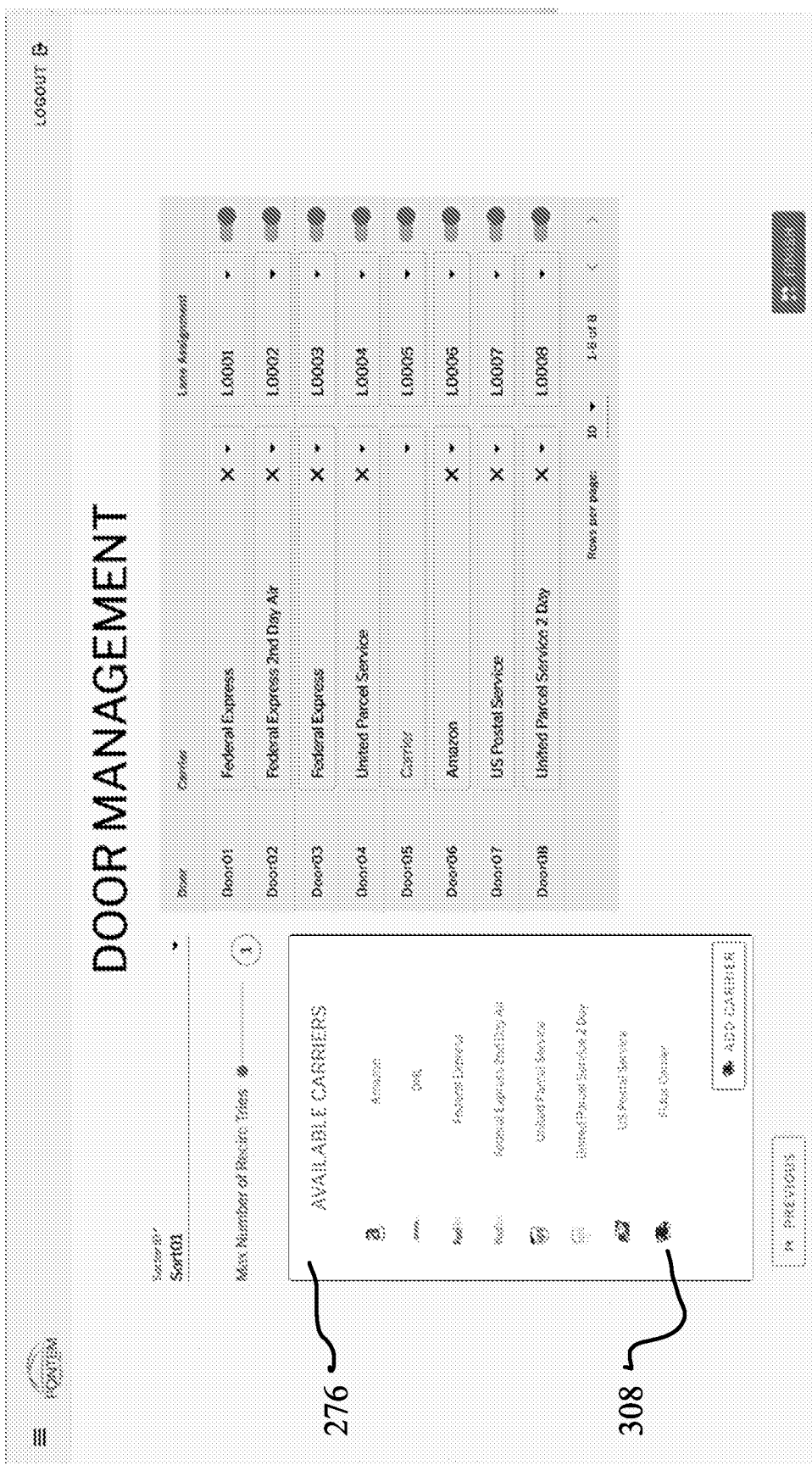
FIG. 13 is a screenshot of one embodiment of the present invention.

FIGS. 12 and 13 show adding a new carrier at Add New Carrier 302 to the Available Carriers 276. The user enters Carrier ID 304 and Carrier Name 306. Adding the new carrier provides additional carriers to be assigned doors shown in FIG. 11. The new carrier added in FIG. 12 appears at Carrier 308 in the Available Carriers 276 shown in FIG. 13.

Figure 14:
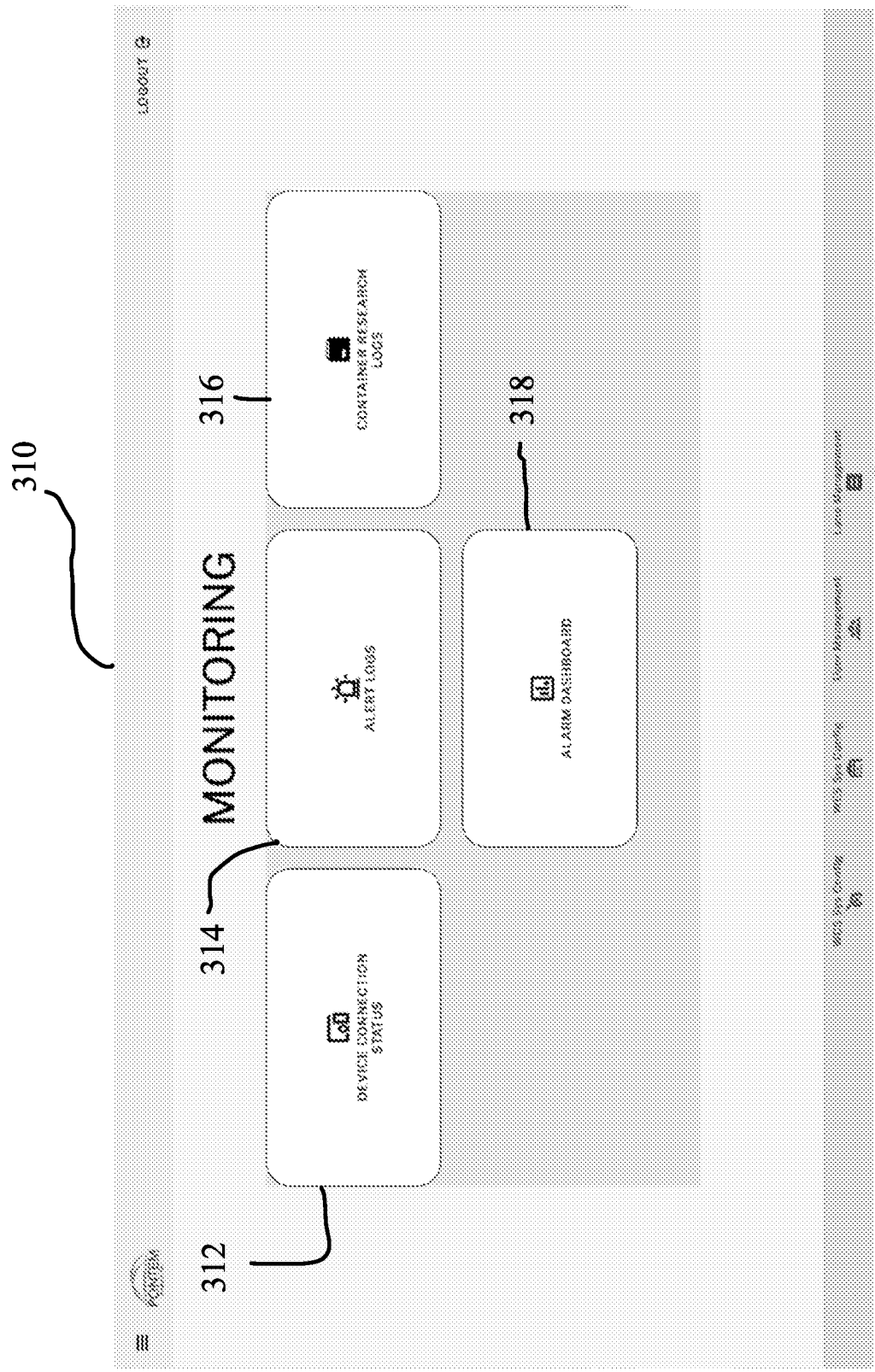
FIG. 14 is a screenshot of one embodiment of the present invention.

FIG. 14 shows the monitoring 310 available through the WCS. The WCS allows monitoring of Device Connection Status 312, Alert Logs 314, Container Research Logs 316, and Alarm Dashboard 318. Users can monitor the different devices/systems identified as the nodes within the WCS. The monitoring through the WCS indicates operational health of the warehouse system and potential issues concerning the warehouse system. The WCS also shares data with other platforms via Rest API's by associating machine data with the software data to improve monitoring.

Figure 15:
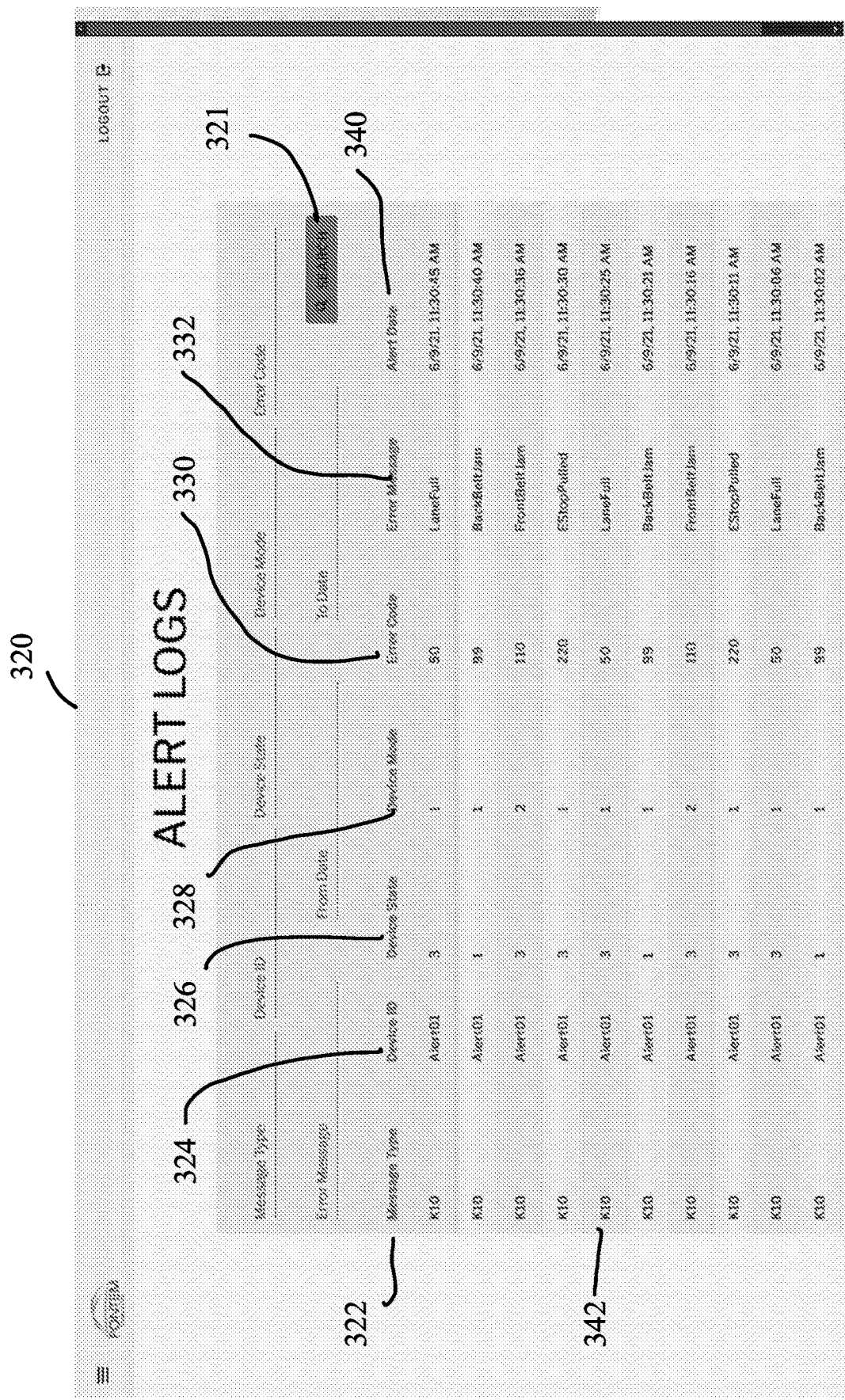
FIG. 15 is a screenshot of one embodiment of the present invention.

The WCS provides Alert Logs 320 as shown in FIG. 15. The user may enter a search query 321 to search the Alert Logs 320 to find an alert. The Alert Logs 320 lists different alerts 342. Each alert is associated with a Message Type 322, Device ID 324, Device State 326, Device Mode 328, Error Code 330, Error Message 332 and Alert Date 340.

The alert 342 identifies the error message and the device/system for the user. The user can quickly review the alerts associated with the warehouse.

FIG. 16 shows the device/system connection status of the nodes identified in the WCS at Device Connection Status 312. The connection status identifies the Device Name 344, the IP Address 346, and the status 348. The status informs the user of the operational status of each device/system within the WCS and the device/system's connection to the WCS.

Figure 17:
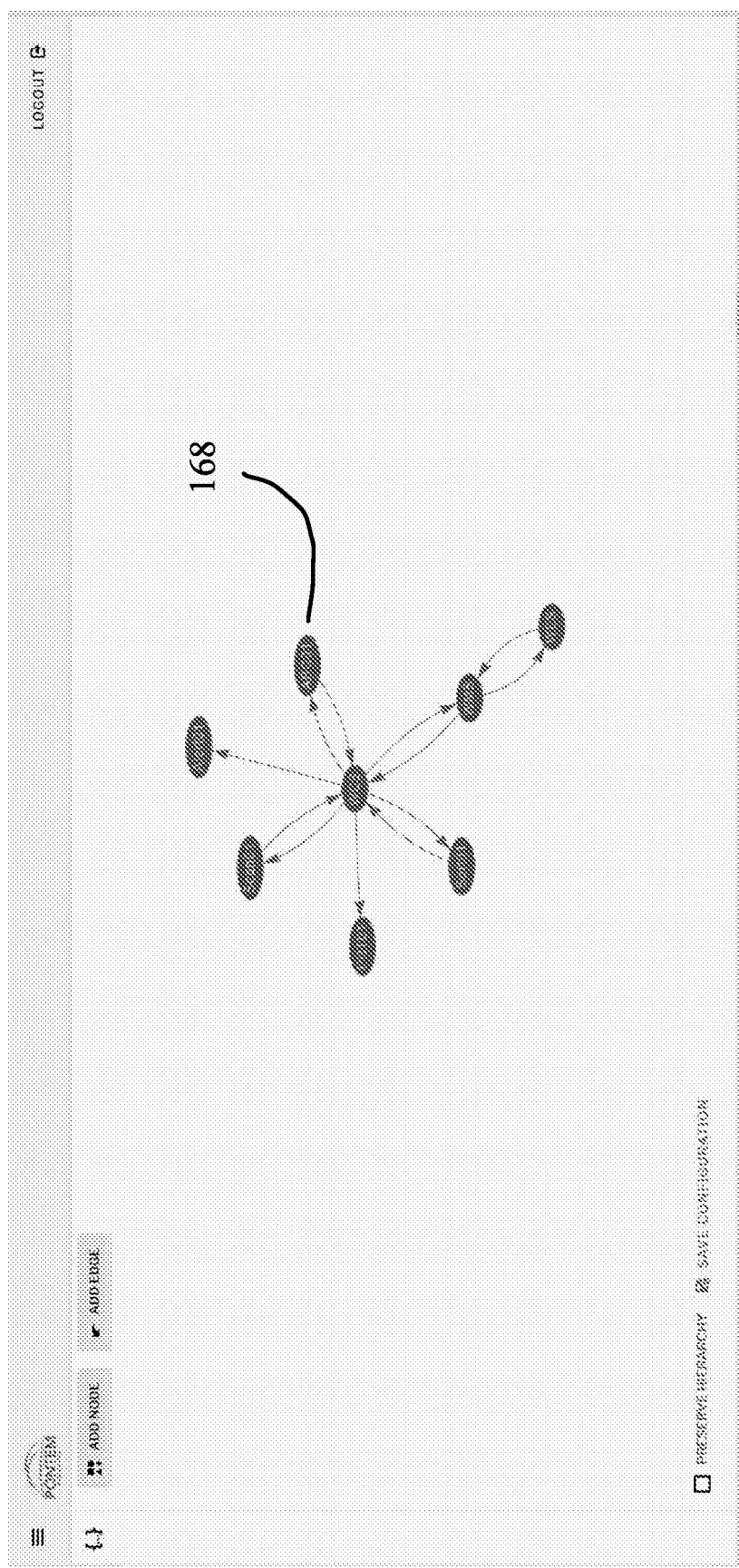
FIG. 17 is a screenshot of one embodiment of the present invention.

FIG. 17 shows the node configuration 168 for the WCS. The node configuration 168 shows the mapping of the nodes with the WCS. Each node represents a device or system. Lines between the nodes define the communication and relationships between each node and the overall node configuration 168. The nodes identified within the WCS are mapped for communication to allow the communication and proper message handling for the communication.

As discussed above, the message handling of the nodes are defined within the WCS. The WCS maps the associations between the fields of the message for the device/system and the fields of the WCS. Mapping the data fields creates an association for communicating between the different devices/systems.

Such quick mapping of the fields allows quick configuration and modification of the WCS. User can add additional devices/systems to the warehouse system. Instead of waiting for the configuration through programming, the WCS simply requires adding a node to the node configuration 168 to represent the added device/system. The WCS identifies the communication path and maps the messaging of the node to the fields of the WCS. The WCS also identifies the edges and connections to the other nodes (devices/systems) defined in the WCS.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A warehouse system for communicating between a transmitting warehouse device and a receiving warehouse device, the system comprising:
   a computing device that communicates with the transmitting warehouse device and the receiving warehouse device, the transmitting warehouse device transmitting an inbound message to the computing device;

the computing device receiving the inbound message, the computing device modifying the inbound message to an outbound message, wherein the outbound message is different than the inbound message, wherein the receiving warehouse device receives the outbound message;

the computing device associating the receiving warehouse device with a device ID, a device type, a data protocol, a message delimiter, a message prefix, and a message suffix;

wherein the device ID identifies the receiving warehouse device;

wherein the device type identifies a type of the receiving warehouse device;

wherein the data protocol identifies a protocol for communicating with the receiving warehouse device, wherein the outbound message is formatted according to the data protocol associated with the receiving warehouse device;

wherein a first field and a second field of the outbound message is separated by the message delimiter associated with the receiving warehouse device;

wherein the outbound message begins with the message prefix associated with the receiving warehouse device followed by the message delimiter;

wherein the outbound message terminates with the message delimiter followed by the message suffix associated with the receiving warehouse device.

2. A warehouse system for communicating between a transmitting warehouse device and a receiving warehouse device, the system comprising:

a computing device that communicates with the transmitting warehouse device and the receiving warehouse device, the transmitting warehouse device transmitting an inbound message to the computing device;

the computing device receiving the inbound message, the computing device modifying the inbound message to an outbound message, wherein the outbound message is different than the inbound message, wherein the receiving warehouse device receives the outbound message;

the computing device associating the transmitting warehouse device with a device ID, a device type, a data protocol, a message delimiter, a message prefix, and a message suffix;

wherein the device ID identifies the transmitting warehouse device;

wherein the device type identifies a type of the transmitting warehouse device;

wherein the data protocol identifies a protocol for communicating with the transmitting warehouse device, wherein the inbound message is formatted according to the data protocol associated with the transmitting warehouse device;

wherein a first field and a second field of the inbound message is separated by the message delimiter associated with the transmitting warehouse device;

wherein the inbound message begins with the message prefix associated with the transmitting warehouse device followed by the message delimiter;

wherein the inbound message terminates with the message delimiter followed by the message suffix associated with the transmitting warehouse device.

\* \* \* \* \*